Figure 1:
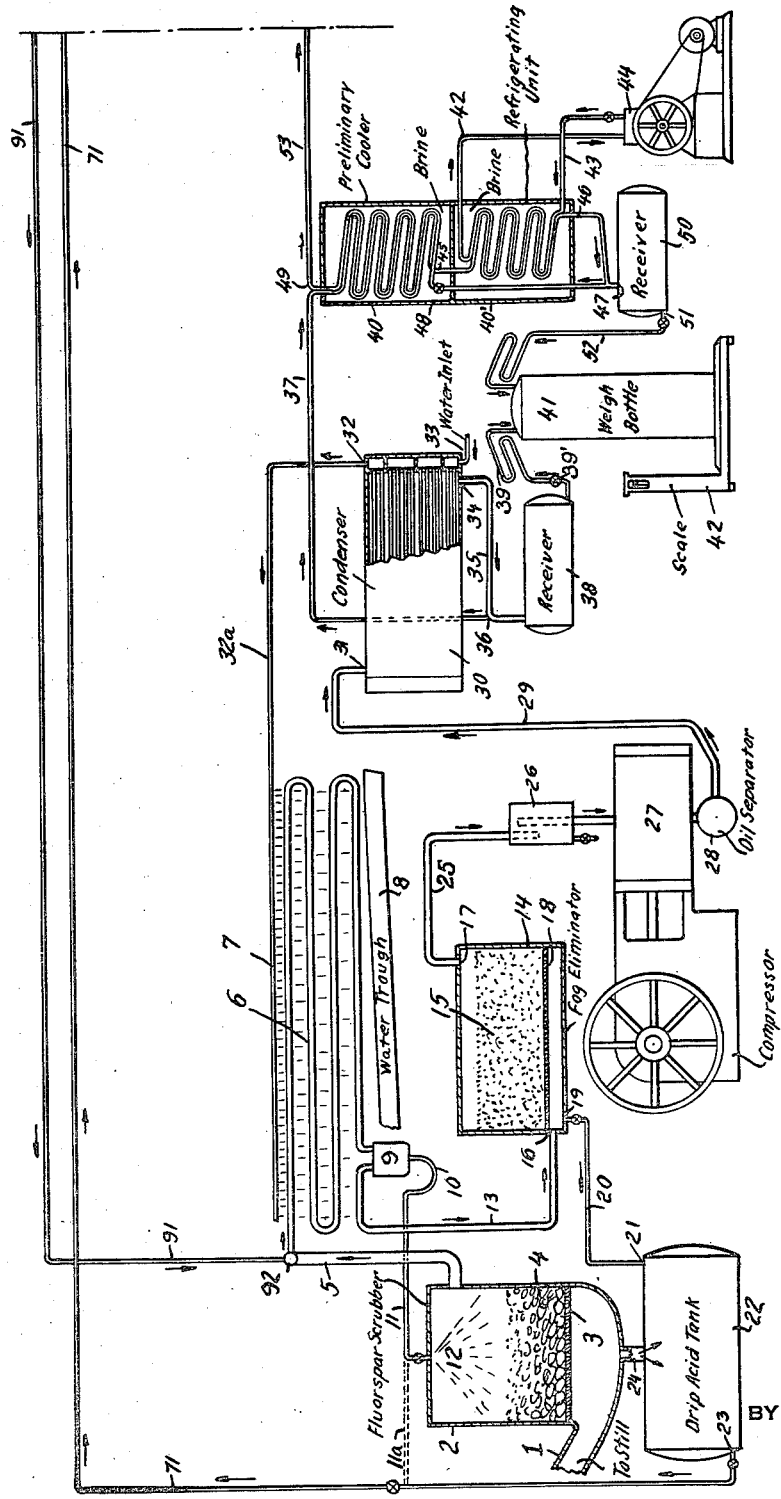

July 27, 1937.  H. B. BISHOP  2,088,048
HYDROFLUORIC ACID PRODUCT AND METHOD OF PRODUCING THE SAME
Filed July 30, 1932   2 Sheets-Sheet 1

INVENTOR
HOWARD B. BISHOP
BY
ATTORNEYS

Patented July 27, 1937

2,088,048

UNITED STATES PATENT OFFICE 2,088,048

HYDROFLUORIC ACID PRODUCT AND METHOD OF PRODUCING THE SAME

Howard B. Bishop, Summit, N. J.

Application July 30, 1932, Serial No. 626,822

15 Claims. (Cl. 23—153)

The present invention relates to a hydrofluoric acid product and method of producing the same. The product in question differs from chemically pure anhydrous hydrofluoric acid in that it is a rectification product and comprises, besides HF a minor percentage (of the order of less than 3% and preferably less than $\frac{1}{10}$ of 1%) of alien substances such as water, silicon tetra-fluoride and iron, all of them indigenous to the raw material or the apparatus used for rectification but inactive in their own respective capacities in the state of extreme dilution in which they exist in the product.

Heretofore hydrofluoric acid has been made in the laboratory by heating anhydrous potassium bi-fluoride and condensing the vapors. In this way a 100% HF product may be obtained but the process is so expensive as not to be available for commercial purposes. Other processes for producing concentrated HF, heretofore proposed, involved distilling a concentrated acid solution and absorbing the acid vapors therefrom in concentrated acid, in this way increasing the concentration to a solution containing about 85% to 90% HF. Another method heretofore proposed comprises fractionally condensing at decreasing temperatures the gases evolved from heating aqueous solutions of hydrofluoric acid and then to render the product anhydrous by treating with oleum. This method proved impractical because the hydrofluoric acid forms an addition product with sulphuric acid or oleum with generation of considerable heat and it is practically impossible to effect a separation when thus combined.

Commercial anhydrous hydrofluoric acid has therefore thus far been an unknown commodity, incapable of production by any known procedure.

I have now discovered that important and valuable results may be obtained in the industry by refraining from the effort to produce chemically pure anhydrous hydrofluoric acid or from striving to get along with concentrated solutions of hydrofluoric acid containing up to 90% HF but in lieu thereof producing a product which shall be substantially anhydrous hydrofluoric acid still containing however alien substances indigenous to the raw material or the apparatus used for rectification, provided that the percentage of the aggregate amount thereof is reduced to such a minor degree as to render them inactive in their own respective capacities, i. e., below 3% and preferably less than $\frac{1}{10}$ or 1%. Such a product is wholly new and was never, so far as I am aware, produced before my invention thereof. In order to produce the new product, I have devised suitable apparatus and methods capable of arriving at the desired result.

The method, briefly stated, comprises conducting the reaction product of sulphuric acid and calcium fluoride through a scrubber preferably containing crushed and graded fluor-spar, cooling the gas which has passed through said scrubber to a temperature such that a maximum vapor pressure of HF and a minimum vapor pressure of water is obtained, using the condensate of said cooling step to flush out the scrubber, compressing the gas which was not condensed in the cooler, and then condensing the gas under the said pressure. The pressure step, being an aid to the liquefaction of the hydrofluoric acid, may, of course, where facilities are available, be replaced by more intense refrigeration. Preferably a purification system for the elimination of the sulphur impurities, solids, scale, oil from the compressor, and the like, is interposed between the preliminary cooling stage and the condensing and refrigerating stage. Preferably, also, the drip acid which has been used for flushing the scrubber is utilized in conjunction with an absorbing system for the residual gases from the refrigerating system whereupon a fractionating procedure may be advantageously applied to the result to supply additional quantities of the substantially anhydrous HF.

Figure 2:
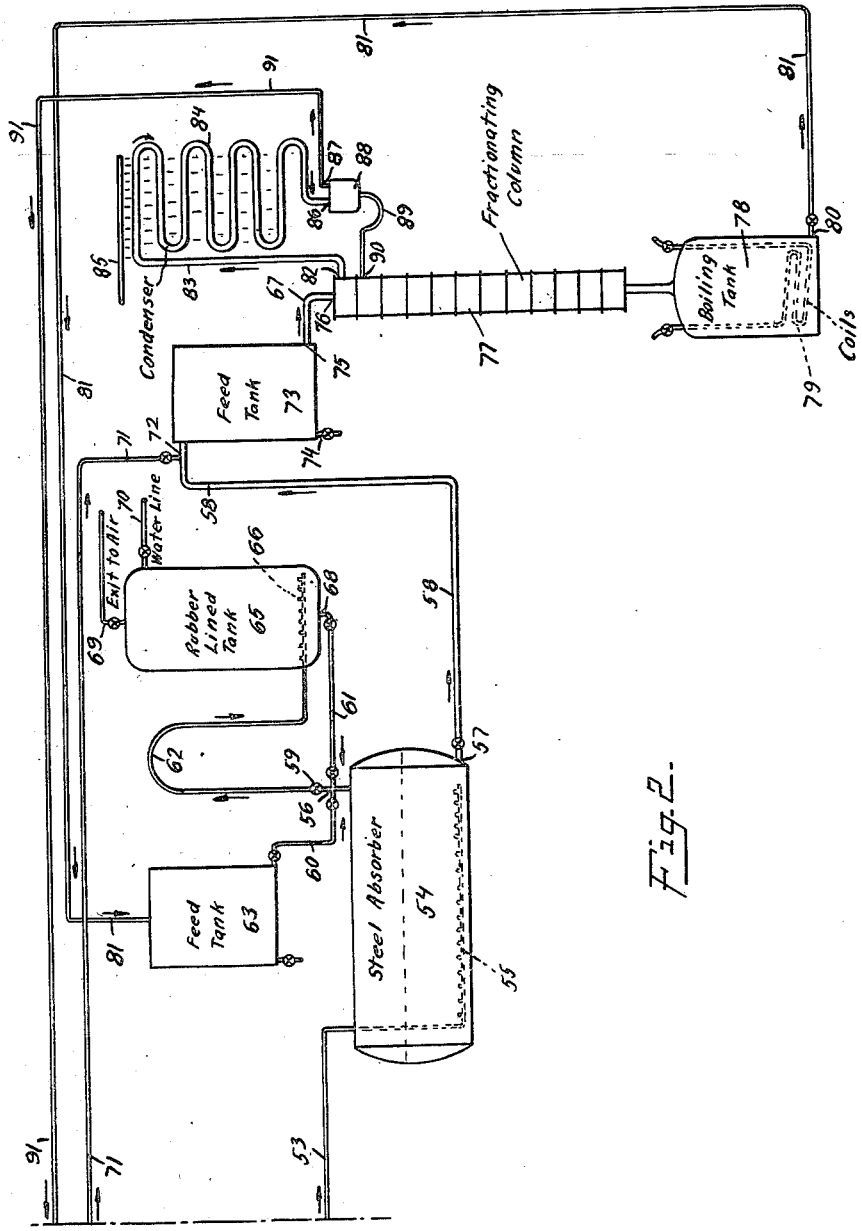

Apparatus suitable for carrying out the invention is illustrated in the accompanying drawings which are illustrative of one form of apparatus which may be advantageously employed to perform the improved process and to produce the improved product. Fig. 1 is a diagrammatic view of the apparatus through to the refrigeration stage, and Fig. 2 is an extension or continuation of Fig. 1 showing the apparatus lying beyond the point where the product is refrigerated. The two figures together represent a single set of apparatus divided for purposes of presenting larger scale drawing than would be possible if the whole of the apparatus were shown on a single sheet.

In the drawings the line 1 indicates a conduit pipe leading from a still or reaction vessel, constructed in a well known manner, in which vessel a high boiling acid, e. g., concentrated sulfuric acid, is caused to react upon a fluoride, such as calcium fluoride, the latter commonly called fluorspar, at a temperature of about 600–800° F., whereby hydrofluoric acid gases are generated which contain a small amount of sulfuric acid vapors and also entrained droplets of such acid carried over by the gas stream, sulfur dioxide, sulfur trioxide, water vapors, volatile silicon compounds, dust particles and traces of other impurities. These gases are under the influence of the sucking action generated by the working of the compressor pump 27.

It is advantageous to have the gases from the still as free from air as practicable in order to save the power necessary for the final liquefaction of the HF product, and also to prevent the generation of a fog produced by the moisture in the atmosphere coming in contact with the acid vapors. It is therefore of advantage to conduct the original generation of gas in such a manner that the gas entering the apparatus shown in Fig. 1 of the drawings through the line 1, shall be as free from air as possible.

The gases after passing through line 1 travel upwardly through the scrubber 2 within which a screen 3 is suitably arranged upon which a layer of a scrubbing material 4, capable of reacting with sulfuric acid, is provided. As filtering means fluorspar is used on account of its ability not only to react with the sulfuric acid but also to form additional hydrofluoric acid gas by this reaction and an insoluble, readily removable sulfate, calcium sulfate. The scrubbing material is arranged upon the screen in such a way that the gases first have to pass coarse particles of the scrubbing medium which gradually become smaller and smaller, the size of them varying from 2 inches diameter at the bottom to ½ inch diameter at the top of the filter bed.

After passing the scrubber 2 the gases are conducted through pipe 5, connected to the upper part of the scrubber 2 preferably at a point diametrically opposite to the point of connection of the pipe 1, to the cooler 6 of any suitable construction, e. g., comprising an interconnected pipe system which is cooled by a stream of water to about 70° F., the water being supplied by the water pipe line 7 and drawn off by the trough 8. In the cooler 6 the HF gas and the condensed water containing HF are brought to a temperature equilibrium, the temperature being such that a maximum vapor pressure of HF and a minimum pressure of water is obtained. In other words, the HF gas is used as its own drying agent, avoiding entirely the necessity of adding any foreign drying medium such as sulfuric acid. The condensed and uncondensed components of the gas and vapor mixture flow into the separator 9 wherein the condensate, consisting of hydrofluoric acid and condensed water vapor, is separated from the gas and is drawn off through a pipe 11 provided with a suitable trap 10. This pipe 11 is connected with the scrubber 2 and terminates in a distributor 12 arranged at the top of the scrubber 2. In this way the condensate is distributed upon the upwardly flowing gases after they have passed the filter bed 4 where they have been freed from sulfuric compounds. The warm gases thereby drive out a portion of the hydrofluoric acid contained in the condensate, the remainder trickling through the filter bed 4, flowing toward the bottom of the scrubber 2 and being discharged through pipe 24 as drip acid into a suitable drip acid storage tank 22. This drip acid, when passing the filter bed 4, washes down the calcium sulfate formed by the reaction of the gas-vapor mixture with the absorbing medium. It has a concentration of about 60–70% hydrofluoric acid. The acid from the tank 22 may be periodically recirculated through the scrubbing tower 2 to wash down the calcium sulfate in which case the acid for that purpose is taken from the line 71 at 11a.

The fluorspar of the filter bed 4 is replaced from time to time.

At 23 the drip acid storage tank is connected with a pipe line 71 by which the drip acid is conveyed to the feed tank 73 and to the fractionating still 77 as will be described later on.

The uncondensed gases leaving the separator 9 are conducted to the fog eliminator 14 by the pipe line 13. This fog eliminator has a screen 18 arranged in it upon which a layer of charcoal 15 or any other suitable material capable of removing sulfur trioxide fume and other solid and liquid bodies carried along by the gas stream is provided. After leaving the fog eliminator 14 at 17 and passing through the pipe 25 and a separator 26 (to prevent scale from the pipe lines or other foreign solid matter passing into the compressor) the gases are sucked into the horizontal compressor 27, preferably one which is equipped with poppet valves and having the inlet valves in the top and the discharge valves in the bottom of the compressor. By the action of this compressor the gas is compressed to a pressure of about 60 lbs. The compressed gas, after passing the oil separator 28 wherein entrained oil from the compressor is separated and drained off, is then conducted by the pipe 29 to the top opening 31 of the condenser 30 constructed in any suitable manner wherein the gas is cooled below the boiling point of the hydrofluoric acid, i. e., to at least 50–60° F. The cooling is accomplished by a stream of cold water entering the condenser at 33 and leaving it at 32. The outlet water may be used to supply the water for the water line 7, in which case the connection 32a is made use of. In this condenser part of the hydrofluoric acid is liquefied. It leaves together with the uncondensed gas the cooler at 34 through the pipe 35 which is connected with the T-pipe 36 from where the uncondensed gas flows through the pipe line 37 into the second cooling system. The condensed hydrofluoric acid is discharged into the receiver tank 38. It it here under the influence of the pressure of the uncondensed gas and is periodically discharged through the pipe line 39 through valve 39' into the weighing bottle 41 placed upon the scale 42. The gas pressure forces the liquid hydrofluoric acid into the weighing bottle 41. When the valve 39' is closed the liquid hydrofluoric acid again begins to accumulate in the receiver tank 38 while the uncondensed gas, as described before, flows into the preliminary cooler 40 of the second low temperature cooling system which it enters through line 37.

This second cooling system consists of a tank divided by the partition 45 into two parts, an upper one, the preliminary cooler 40, and a lower one, the refrigerator 40'. Both compartments 40 and 40' are filled with brine. The lower compartment 40' contains a coil connected with the pipes 42 and 43, leading to and from the refrigerating machine 44 through which pipes and coil the refrigerating liquid (sulfur dioxide or the like) circulates and cools the brine solution of the lower part of the tank to about 15° F. The refrigerating coil is arranged in such a way that it supplies the refrigerating liquid in countercurrent to the flow of the gas to be cooled, as can be seen in the drawings. The gases entering the preliminary cooler 40 and leaving the refrigerating part 40' at 46 are reconducted by the T-pipe 47 into the preliminary cooler 40. By the expansion valve 48 the pressure of the cold exit gases is reduced to about 10 lbs. producing a refrigerating effect whereby the uncondensed gases coming in through pipe 37 are pre-cooled before entering the refrigerating unit 40'. The low temperature generated by this expansion furthermore, serves for cooling the brine in the upper part of the second cooling system, the preliminary cooler. The remaining, uncondensed gases flow through the preliminary cooler 40 in countercurrent to the inflowing gases and leave it at 49.

The condensed hydrofluoric acid, obtained in the refrigerating part 40' flows through the T-pipe 47 into the receiver tank 50 from where it is periodically discharged by the pipe line 52 provided with the valve 51, into the weighing bottle 41 in the same way as described previously.

The second major part of the apparatus which will be described in the following paragraphs, deals with the recovery of all of the hydrofluoric acid gas which has not been condensed and recovered as liquid hydrofluoric acid in the cooling systems described above; it is of not less importance than the first part of this process because it enables one to recover practically all of the hydrofluoric acid produced by the interaction of sulfuric acid and a fluoride and renders the process very economical.

The expanded gases leaving the second cooling system at 49 are conducted by means of the pipe 53, preferably provided with a check valve (not shown), into the steel absorber 54 which is filled with hydrofluoric acid of about 60% strength. The gases, still under pressure, enter the absorber by means of a perforated pipe 55 or coil or any other device enabling thoroughly mixing of gas and absorption liquid.

When the acid in the absorber 54 is concentrated to about 80% strength, part of it is withdrawn through valve 57 and line 58 into the feed tank 73 from where it is charged into the fractionating apparatus 77 as will be described later on. The withdrawn acid is replaced with diluted acid of about 30-35% strength in order again to reduce the strength of the acid in the absorber to about 60%. This diluted acid is supplied either from the rubber lined feed tank 63 or from the final absorber 65 by means of the pipe lines 60 and 61, respectively, and the T-pipe 56 with suitably arranged valves. The feed tank 63 is periodically supplied through the pipe line 81 with 35% acid from the boiling tank 78. This acid when used for filling tank 63 is first cooled as for example by circulating a cooling medium through the coil 79 in tank 78. The gases leaving the absorber 54 through the pipe 62, provided with a valve 59, are freed of the last amounts of hydrofluoric acid in the rubber lined absorber 65 which is filled with water by means of the water line 70. The gases entering the tank 65 through the perforated pipe 66 or coil or any other suitable device enabling intimate contact of absorption liquid and gases to be absorbed, are washed thoroughly and the residue is discharged into the air by the pipe 69. The residual gases are preferably passed through a rubber lined coke tower (not shown) before leaving the system as exhaust gases.

As soon as the dissolved hydrofluoric acid has reached a concentration of about 30% in the absorber 65, it is withdrawn through the pipe 61, provided with a valve 68, and is used for the dilution of the absorbing liquid in the absorber 54. The final absorber 65 is then refilled with water.

The feed tank 73 not only is filled with the acid of 80% strength from the absorber 54 but also with the drip acid of 60 to 70% strength of the drip acid tank 22 which acid is withdrawn from the drip acid tank at 23 and conducted by means of the pipe line 71 into the feed tank 73 entering the latter at 72.

From the feed tank 73 the hydrofluoric acid either may be put to commercial use as such, in which case it is withdrawn at 74 or it may be fractionated and returned via pipe line 91 into the system 6, 13, 15, 27, 29, 30, 38, 41, this procedure resulting in an increased production of anhydrous hydrofluoric acid at 41. For this purpose it is discharged from the feed tank 73 at 75 through the pipe line 67 and enters the fractionating column 77 at 76, said column being located above the boiling tank 78, heated by means of the steam coils 79.

The fractionated vapors and gases leave the fractionating column at 82, and are conducted by means of the pipe 83 into the cooler 84, where the temperature is reduced by water supplied by the water pipe line 85. The condensate and the uncondensed gases enter the separator 88 at 86, where the condensate is returned through a trap device 89 into the fractionating column 77 at 90.

The uncondensed gases leave the separator at 87 and are returned by the pipe line 91 to the gas mixture generated by interaction of sulfuric acid and a fluoride, preferably at 92 between the fluorspar scrubber 2 and the first cooler 6.

The hydrofluoric acid of 35% strength accumulated in the bottom of the boiling tank 78 is periodically discharged at 80 and transferred to the feed tank 63 by means of the pipe line 81. It serves for replenishing and diluting the absorption liquid in the main absorbing tank 54.

It will be understood that many variations in the process as well as in the apparatus may be made without departing from the principle of the invention as defined in the following claims. It is also of advantage in the efficient and economical operation of the apparatus that the process is a continuous one with the results produced readily controllable by regulating the operating conditions.

This improved process has in practice produced high yields of anhydrous hydrofluoric acid of a very high percentage without the aid of a drying agent other than the hydrofluoric acid itself. It has been found that acid of this degree of purity has very little, if any, effect on iron and can therefore be stored and shipped in ordinary welded steel tanks, the welds being preferably electrically made and as free from oxide as possible as the latter is dissolved by hydrofluoric acid. It has further been found that bronze is more resistant to hydrofluoric acid than iron, and for such parts as valves, compressor cylinder, piston, and the like, this material preferably is used.

Dry lubricating oil is scarcely affected, if at all, by the acid, so that good lubrication for the compressor can be obtained. To avoid loss of gas through the stuffing box of the compressor preferably an elongated stuffing box is used.

One of the advantages of this process is that by the use of a positive compressor the gases are sucked from the still at a reduced pressure, so that the time required to finish a charge in the still is reduced.

Furthermore, much less water is required to cool the hydrofluoric acid gases than is required when the gas is first dissolved in water as has been done hitherto.

The anhydrous acid produced according to this process has been found to be very destructive to such materials as rubber, paper, cotton, or the like. Therefore the material for gaskets should consist of pressed asbestos as it is used for work with high pressure steam while, for packings, copper-asbestos-graphite has been found to be very satisfactory.

These materials, however, do not by any means exclude the use of other suitable materials which can be used for these purposes.

The obtained anhydrous hydrofluoric acid is especially useful for the manufacture of difluoro dichloro methane and other similar products used for mechanical refrigeration; but it may be used for any other purpose for which a substantially anhydrous and pure hydrofluoric acid is employed.

The anhydrous product obtained by the process hereinabove described consists in the main of HF but contains also minute quantities of iron from the pipe lines, a very minor percentage of water and a small amount of silicon tetra-fluoride which is only minutely soluble in the hydrofluoric acid as produced by this process. The percentage of such alien materials can be kept as low as .07% or even lower by the proper conduct of the process though the percentage even when somewhat greater, say 3%, still leaves the product capable of advantageous use for many industrial purposes. In other words, the hydrofluoric acid product of this invention is one whose performance in practical use is equal to that of chemically pure anhydrous hydrofluoric acid notwithstanding the fact that alien substances are present to the limited degree indicated. It has also been discovered in respect to the new product that by the addition of anhydrous ammonia, say 5 to 10% by weight, its vapor pressure and fuming properties are reduced to such an extent that it can be handled in the same manner as and with less annoyance than ordinary commercial 60% hydrofluoric acid. Otherwise the anhydrous acid would have to be handled in steel containers made to withstand pressure, ordinarily about 15 pounds per square inch at ordinary summer temperature. When combined with anhydrous ammonia, as stated, the resultant product is capable of use for the manufacture of frosting compound, for laundry purposes and other uses.

The addition of anhydrous ammonia to anhydrous hydrofluoric acid appears to produce more than merely a mixture of the two substances. This is evidenced not merely by the fall in the vapor pressure of the hydrofluoric acid, but by the large quantities of heat that are liberated when the mixing is effected. These phenomena indicate that a chemical reaction of some kind occurs between the two substances, probably resulting in the formation of a compound of the general formula $(NH_3)(HF)_n$, the value of the number $n$ being unknown and probably being variable.

It will observed that the arrangement of apparatus described permits the process to be readily adapted to varying conditions, for example, in case the gas mixture entering the apparatus at 1 or the pipe 5 contains very little water, the cooling stage at 6 and 7 need not be immediately followed by a separation of condensed liquid in 9, since in view of the small amount of water in the gas, it may be left in and condensed with the bulk of the anhydrous acid. In other words, although in that case there will be a separation between the condensed liquid and uncondensed hydrofluoric gas, the separation will occur at a later stage than that indicated in the drawings at 9, the residual uncondensed gas in either event passing through an absorbing medium such as 54, the liquid produced in said step being capable of further treatment by being fed into the fractionating column 77 and the substantially pure anhydrous hydrofluoric acid gas separated therein from water, sulfuric and other impurities.

I claim:

1. The process of producing substantially pure anhydrous hydrofluoric acid which comprises subjecting fluorspar to the action of a high boiling acid and maintaining in the expelled gas stream a proportion of HF in excess of that which is capable of being condensed out in the form of a water solution of said acid, bringing the mixture of gases and vapors thereby produced in contact wtih a substance capable of reacting with at least part of the impurities contained in said mixture, separating aqueous hydrofluoric acid contained in the gas mixture, by cooling, bringing the condensed liquid and the uncondensed HF gas to a temperature equilibrium and separating the liquid from the gas.

2. The process set forth in claim 1, in which the condensed liquid is distributed prior to the cooling step into the stream of the gas mixture and in contact with the substance capable of reacting with part of the impurities contained in the mixture.

3. The process of producing substantially pure anhydrous hydrofluoric acid which comprises subjecting fluorspar to the action of sulfuric acid and maintaining in the expelled gas stream a proportion of HF in excess of that which is capable of being condensed out in the form of a water solution of said acid, bringing the mixture of gases and vapors thereby produced in contact with relatively coarse, crushed, graded calcium fluoride, separating aqueous hydrofluoric acid contained in the gas mixture, by cooling, bringing the condensed liquid and the uncondensed HF gas to a temperature equilibrium and separating the liquid from the gas.

4. The process of producing substantially pure anhydrous hydrofluoric acid which comprises subjecting fluorspar to the action of sulfuric acid and maintaining in the expelled gas stream a proportion of HF in excess of that which is capable of being condensed out in the form of a water solution of said acid, separating aqueous hydrofluoric acid contained in the gas mixture thereby produced, by cooling, bringing the condensed liquid and the uncondensed HF gas to a temperature equilibrium, separating the liquid from the gas, compressing the gas, cooling the gas sufficiently to liquefy a part thereof, releasing the pressure on the unliquefied gas and employing the resultant temperature reduction in the said cooling step.

5. The process of producing substantially pure anhydrous hydrofluoric acid which comprises subjecting fluorspar to the action of sulfuric acid and maintaining in the expelled gas stream a proportion of HF in excess of that which is capable of being condensed out in the form of a water solution of said acid, separating aqueous hydrofluoric acid contained in the gas mixture thereby produced, bringing the condensed liquid and the uncondensed HF gas to a temperature equilibrium, separating the liquid from the gas, subjecting the gas to condensing conditions, passing the residual uncondensed gas through an absorbing medium and fractionating the absorbing medium.

6. The process of producing substantially pure anhydrous hydrofluoric acid which comprises subjecting fluorspar to the action of sulfuric acid and maintaining in the expelled gas stream a proportion of HF in excess of that which is capable of being condensed out in the form of a water solution of said acid, separating aqueous hydrofluoric acid contained in the gas mixture thereby produced, by cooling, bringing the condensed liquid and the uncondensed HF gas to a temperature equilibrium, separating the liquid from the gas, refrigerating the gas to reduce it to liquid form, passing the residual uncondensed gas through an absorbing medium, fractionating the absorbing medium, and admixing the gas from the fractionating step with the gas mixture on its way to the first cooling step of the process.

7. The process of producing substantially pure anhydrous hydrofluoric acid which comprises subjecting fluorspar to the action of sulfuric acid and maintaining in the expelled gas stream a proportion of HF in excess of that which is capable of being condensed out in the form of a water solution of said acid, bringing the mixture of gases and vapors thereby produced in contact with a substance capable of reacting with at least part of the impurities contained in said mixture, separating aqueous hydrofluoric acid contained in the gas mixture, by cooling, bringing the condensed liquid and the uncondensed HF gas to a temperature equilibrium, separating the liquid from the gas, refrigerating the gas to condense HF therefrom, absorbing the residual uncondensed gas in an absorbing medium, adding to the absorbing medium after it has become strengthened in HF content, the drip acid from that stage of the process where the liquid from the first cooling step of the process is contacted with a substance capable of reacting with part of the impurities contained in the initial gas mixture and fractionating the resultant liquid mixture.

8. The process of producing substantially pure anhydrous hydrofluoric acid which comprises subjecting fluorspar to the action of sulfuric acid and maintaining in the expelled gas stream a proportion of HF in excess of that which is capable of being condensed out in the form a water solution of said acid, separating aqueous hydrofluoric acid contained in the gas mixture thereby produced, by cooling, bringing the condensed liquid and the uncondensed HF gas to a temperature equilibrium, separating the liquid from the gas, refrigerating the gas to reduce it to liquid form, passing the residual uncondensed gas through an absorbing medium, fractionating the absorbing medium and adding the liquid residue of the fractionating step to the absorbing medium.

9. The process of producing substantially pure anhydrous hydrofluoric acid which comprises subjecting fluorspar to the action of sulfuric acid and maintaining in the expelled gas stream a proportion of HF in excess of that which is capable of being condensed out in the form of a water solution of said acid, separating aqueous hydrofluoric acid contained in the gas mixture thereby produced, by cooling, bringing the condensed liquid and the uncondensed HF gas to a temperature equilibrium, separating the liquid from the gas, refrigerating the gas to reduce it to liquid form, passing the residual uncondensed gas through an absorbing medium, fractionating the absorbing medium, adding the liquid residue of the fractionating step to the absorbing medium, passing the residual gas not absorbed by the absorbing medium through a liquid capable of absorbing HF and adding the resultant dilute HF to the absorbing medium.

10. The process of producing substantially pure anhydrous hydrofluoric acid which comprises subjecting fluorspar to the action of a hot sulfuric acid under approximately anhydrous conditions so as to maintain in the discharging gas stream a proportion of HF in excess of that which is capable of being precipitated with the condensed moisture in the form of a saturated solution, subjecting the gas mixture so obtained to condensing conditions at a temperature slightly above the boiling point of HF at the pressure employed, conducting the gas and condensed liquid in co-current relationship until an approximate temperature equilibrium has been established between the condensed liquid and uncondensed HF gas, and then separating the liquid from the gas.

11. The process of producing substantially pure anhydrous hydrofluoric acid which comprises subjecting fluorspar to the action of hot sulfuric acid under approximately anhydrous conditions so as to maintain in the discharging gas stream a proportion of HF in excess of that which is capable of being precipitated with the condensed moisture in the form of a saturated solution, subjecting the gas mixture to condensing conditions by cooling the same to a temperature slightly above the boiling point of HF at the pressure employed, conducting the gas and liquid in co-current relation until an approximate temperature equilibrium is established between the condensate and uncondensed HF, separating the liquid from the gas, removing suspended matter from the HF gas, and liquefying the anhydrous gas.

12. The process of producing substantially pure anhydrous hydrofluoric acid which comprises subjecting fluorspar to the action of hot sulfuric acid under approximately anhydrous conditions so as to main in the discharging gas stream a proportion of HF in excess of that which is capable of being precipitated with the condensed moisture in the form of a saturated solution, subjecting the gas mixture so obtained to continuous cooling while conducting the uncondensed gas and condensed liquid in co-current relation until an approximate temperature equilibrium between the uncondensed HF gas and condensate is established at a temperature slightly above the boiling point of HF at the pressure employed, separating the liquid from the gas, and then subjecting the gas to refrigeration in at least two stages of diminishing temperature, the last cooling stage being effective to condense the anhydrous HF.

13. The process of producing substantially pure anhydrous hydrofluoric acid which comprises subjecting fluorspar to the action of hot sulfuric acid under approximately anhydrous conditions so as to maintain in the discharging gas stream a proportion of HF in excess of that which is capable of being precipitated with condensed moisture in the form of a saturated solution, subjecting the gas mixture so obtained to continuous cooling while maintaining the uncondensed HF in contact with the condensate until an approximate temperature equilibrium between the uncondensed HF and the condensate is established, at a temperature slightly above the boiling point of HF at the pressure employed, separating the liquid from the gas, subjecting the gas to condensing conditions, passing the residual uncondensed gas through an absorbing liquid, then fractionating the solution so obtained and then again subjecting the separated gas to condensation.

14. The process of producing substantially pure anhydrous hydrofluoric acid which comprises subjecting fluorspar to the action of hot sulfuric acid under approximately anhydrous conditions so as to maintain in the discharging gas stream a proportion of HF in excess of that which is capable of being precipitated with the condensed moisture in the form of a saturated solution, leading the resultant gas mixture into contact with a hydrofluoric acid solution of lower temperature and thereby expelling a substantial part of the HF from the solution, cooling the gas stream to a temperature which is above the boiling point of HF at the pressure employed to cause precipitation of the water in the form of a saturated solution of HF, conducting the gas and condensed liquid in co-current relation until an approximate temperature equilibrium is established between the condensate and uncondensed HF, withdrawing and liquefying the anhydrous HF gas so obtained, and leading the liquid condensate into the path of further incoming volumes of the hot gases produced by the treatment of hydrofluoric acid with sulfuric acid.

15. A composition comprising the product resulting from the mixing of approximately 90-95 parts of substantially anhydrous hydrofluoric acid and 10-5 parts of substantially anhydrous ammonia.

HOWARD B. BISHOP.